UNITED STATES PATENT OFFICE.

JAMES C. RICHARDSON, OF LOCKLAND, OHIO.

INSECTICIDE MIXTURE.

SPECIFICATION forming part of Letters Patent No. 273,895, dated March 13, 1883.

Application filed December 12, 1882. (No specimens.)

*To all whom it may concern:*

Be it known that I, JAMES C. RICHARDSON, of Lockland, in the county of Hamilton and State of Ohio, have invented certain Improvements in Solutions to Repel and Destroy Insects, of which the following is a specification.

My invention consists in a novel solution or composition for the treatment of carpet-linings and other articles to protect them against the attack of moths, beetles, and other insects, it being designed primarily to repel such insects, and in case of failure so to do to kill such as eat the article. The ingredients or elements used may vary somewhat, both as to number and proportions; but the two on which I mainly depend, and which are to be used in all cases, are carbolic acid and quassia. To these may or may not be added Carolina tar and sulphate of zinc, as circumstances may require or suggest.

The manner in which I have commonly prepared the solution is as follows: A tank or vat is supplied with about two hundred gallons of water, and in this water is placed one pound of carbolic acid in the form of crystals, together with one hundred pounds of quassia chips. To this is sometimes added five gallons of Carolina tar and five pounds of sulphate of zinc, though these latter elements are sometimes omitted. The whole mass is thoroughly mixed and the water takes up the different matters introduced into it, thus forming a solution suitable for the purpose stated.

The solution is ordinarily sprayed upon the carpet-lining or other body or article to be protected, a suitable sprinkler or jet being employed and the solution forced out by steam or other pressure; or it may be simply sprinkled from a watering-pot, applied with a brush, or contained in a vessel and the article immersed in or drawn through the solution; or, in other words, any convenient or ordinary plan of applying coatings or solutions to surfaces may be followed.

The solution possesses great disinfecting properties, and is therefore further useful on this account, especially when applied to the linings of carpets, or to the carpets themselves, used in hospitals and sick-rooms.

Having thus described my invention, what I claim is—

A solution for protecting bodies against insects, containing water, carbolic acid, and quassia, in substantially the proportions stated.

JAMES C. RICHARDSON.

Witnesses:
 ALBERT P. MORIARTY,
 E. R. BROWN.